Dec. 8, 1964 W. K. REYMOND 3,160,766
SWITCHING CIRCUIT WITH A CAPACITOR DIRECTLY CONNECTED BETWEEN THE BASES OF OPPOSITE CONDUCTIVITY TRANSISTORS
Filed Nov. 28, 1962
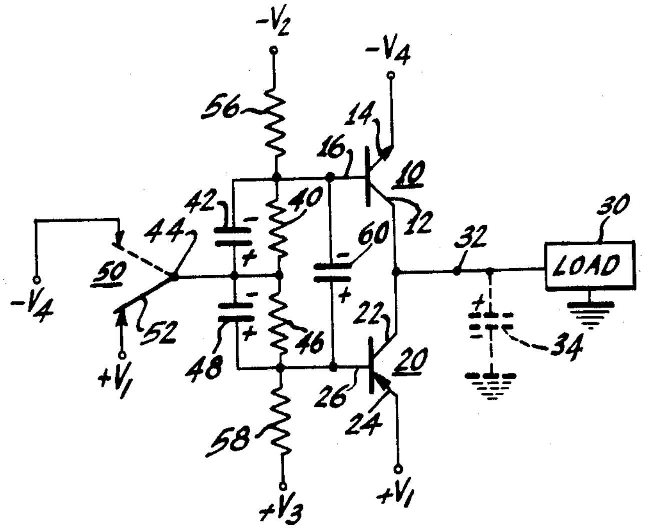
INVENTOR
WELLES K. REYMOND
BY John V. Regan
ATTORNEY

United States Patent Office 3,160,766

Patented Dec. 8, 1964

3,160,766

SWITCHING CIRCUIT WITH A CAPACITOR DIRECTLY CONNECTED BETWEEN THE BASES OF OPPOSITE CONDUCTIVITY TRANSISTORS

Welles K. Reymond, Haddonfield, N.J., assignor to Radio Corporation of America, a corporation of Delaware Filed Nov. 28, 1962, Ser. No. 240,498

4 Claims. (Cl. 307—88.5)

This invention relates to switching circuits and, in particular, to an improved transistor circuit for rapidly and selectively switching the voltage applied to an output load between first and second levels.

Prior art switching circuits generally employ a single transistor, operated as a large signal, nonlinear switch in which the transistor is driven between saturation and cut-off. One of the limitations of such a switching circuit is that the output voltage cannot be changed abruptly by the transistor switch, relatively speaking, when there is capacitance in the output circuit or load. The capacitance can be charged (discharged) rapidly through the low impedance collector-emitter path of the transistor when the transistor is driven into saturation. However, the capacitance cannot be conveniently discharged (charged) when the transistor is driven from saturation to cut-off because the capacitance then must be discharged through the collector-supply resistor and/or output load. Generally speaking, the output voltage changes exponentially as the capacitance discharges, and delays the turn-on or turn-off of load circuits connected at the output of the switch. Another disadvantage of the single transistor switch is that power is dissipated in the collector-supply resistor, thereby unnecessarily limiting the fan-out capability of the switching circuit.

A still further disadvantage of the single transistor switching circuit is that the transistor itself can supply current to the load in only one direction. Any current flowing between the load and the switching circuit when the transistor is cut-off must flow through the collector-supply resistor. Changes in output loading occasion a change in voltage at the output terminal of the switching circuit, and this change in voltage may be sufficient to cause false triggering of load circuits connected at the output of the switching circuit.

It has been suggested that these disadvantages and limitations be overcome by employing two transistors in the switching circuit. One transistor is in saturation and the other transistor is cut-off for one input condition, and the transistors have the opposite operating states for the other input condition to the switching circuit. A problem has arisen in the use of the latter type circuit in that the non-conducting transistor may turn on before the other transistor is brought out of saturation in response to a change in input signal conditions. When this occurs, the low impedance collector-emitter paths of the two transistors are connected in series between points of different operating potential, and the heavy current flow in the series path is sufficient in some cases to burn-out or otherwise destroy one or both of the transistors.

Accordingly, it is an object of this invention to provide an improved switching circuit in which the output voltage may be changed abruptly in response to an input signal and in which the output voltage is relatively unaffected by changes in output loading.

It is another object of this invention to provide an improved switching circuit in which current can be supplied to an output load for one operating condition of the switching circuit and current can be absorbed from the load for the other operating condition.

It is still another object of this invention to provide a switching circuit employing two transistors in which one transistor is in saturation while the other transistor is biased off, and wherein the "off" transistor is prevented from turning on, in response to a change in input signal conditions, until the "on" transistor is brought out of saturation.

These and other objects are accomplished according to the invention by the combination of first and second transistors of opposite conductivity type having their collector-emitter paths connected in series between points of different operating potential. An output terminal is connected between the collector-emitter paths of the two transistors. The transistors are so biased that the first transistor is biased into saturation and the second transistor is cut-off when the input voltage has a first value, and the second transistor is biased into saturation and the first transistor is cut-off when the input voltage has a second value. A capacitor is directly connected between the base eletcrodes of the two transistors and has a value of capacitance such that the voltage at the base electrode of the nonconducting transistor is held beyond cut-off value, when the input voltage changes, until the other transistor is brought out of saturation.

In the accompanying drawing, the sole figure is a schematic diagram of an improved switching circuit according to the invention.

The circuit includes a first transistor 10 of one conductivity type, illustrated as NPN, and a second transistor 20 of opposite conductivity type, illustrated as PNP, having their collector electrodes 12, 22, respectively, connected together and having their emitter electrodes 14, 24, respectively, connected to points of different operating potential. Emitter electrode 14 is connected to a source of $-V_4$ volts and emitter electrode 24 is connected to a source of $+V_1$ volts, one of which may, for example, be reference ground. Voltage sources $+V_1$ and $-V_4$, and other voltage sources to be described, may be batteries (not shown). An output load 30 is connected to an output terminal 32 common to the collector electrodes 12, 22. The output circuit capacitance, which may be stray capacitance and/or the capacitance of the load 30, is represented by the capacitor 34 shown in dashed lines.

A first D.C. coupling network, comprising the parallel combination of a resistor 40 and a capacitor 42, is connected between the base electrode 16 of first transistor 10 and an input terminal 44. A second, similar coupling network comprising a resistor 46 and a capacitor 48 is connected between the input terminal 44 and the base electrode 26 of second transistor 20. Input voltages of either $-V_4$ volts or $+V_1$ volts may be selectively applied at input terminal 44 by means of a switch 50. Switch 50 is illustrated symbolically as a mechanical switch. In actual practice, and as is well known to one skilled in the art, switch 50 may be, for example, a transistor logic or gating circuit wherein the output voltage of the transistor gating circuit may be selectively switched between $+V_1$ and $-V_4$ volts, and wherein input terminal 44 is connected to the output terminal of the gating circuit.

It is desired that the first transistor 10 be biased in the nonconducting condition when the voltage at input terminal 44 is $-V_4$ volts and that first transistor 10 be biased into saturation when the voltage at input terminal 44 is $+V_1$ volts. This is accomplished by a biasing network comprising a resistor 56 connected between base electrode 16 and a source of suitable biasing potential, designated $-V_2$. Resistor 40 in the first coupling network operates as a level shifting device to apply the proper voltage at base electrode 16 for accomplishing the desired operation of first transistor 10. Capacitor 42, in shunt with resistor 40, operates as a speed-up capacitor for fast turn-off of first transistor 10 when the input voltage is switched from $+V_1$ to $-V_4$ volts.

In like manner, it is desired that second transistor 20 be biased into saturation when the input voltage is $-V_4$ volts and that this transistor 20 be biased in the nonconducting condition when the input voltage is $+V_1$ volts. This is accomplished by the coupling resistor 46 operating in combination with a biasing network comprising a resistor 58 connected at one end to base electrode 26 and connected at the other end to a source of bias potential of $+V_3$ volts. Resistors 56 and 58 also serve the function of providing a path for $I_{CO}$ leakage currents in transistors 10 and 20, respectively.

Because minority charge carriers are stored in the base region of a saturated transistor, the output current thereof does not fall immediately to zero upon termination of the enabling input signal. Instead, the output current remains almost at its maximum value for a period of time during which the stored carriers are collected. This period is referred to as "storage time" or "saturation delay time." The transistor current can be increased to a high enough value to damage the transistor if the output impedance is decreased to a very low value during the storage time. It is for this reason that the previously "off" transistor must be prevented from turning on during the storage time of the other transistor in a circuit of the general type illustrated in the drawing. This is accomplished in the circuit of the invention by the capacitor 60 connected between the base electrodes 16, 26.

Consider that the normal operation of the circuit is with the input switch arm 52 connected to the source of $+V_1$ volts. First transistor 10 is biased on in saturation and second transistor 20 is biased in the nonconducting condition. The output voltage then is approximately $-V_4$ volts; first transistor 10 can absorb current from the load at a fixed voltage level, and capacitors 42, 48 and 60 are charged in the polarity direction indicated. Assume now that the switch arm 52 is thrown to the other position, shown in dashed lines, in contact with the $-V_4$ volt source. The input voltage then has a polarity and magnitude to turn off first transistor 10 and to bias second transistor 20 into saturation.

However, second transistor 20 does not turn on until the voltage at its base electrode 26 falls sufficiently in the negative direction to forward bias the emitter 24-base 26 diode. That is to say, second transistor 20 does not turn on as long as its base 26 voltage is beyond cut-off value. Two factors are of importance in this connection. First, the change of voltage required at the base of an off transistor (second transistor 20, in this case), to turn it on, is greater than the change in voltage required at the base of an "on" transistor (first transistor 10, in this case), to turn it off. Second, the impedance looking into the base of the "on" transistor is much lower than that looking into the base of the "off" transistor.

Accordingly, when the input voltage is changed from $+V_1$ to $-V_4$ volts, reverse current, in the conventional sense, flows out of the base 16 of first transistor 10 as the stored carriers are swept out of its base region. Because of the low impedance looking into the base 16, the voltage at the base 16 changes only a slight amount during the storage time of first transistor 10; this change in voltage may be of the order of fifty millivolts, more or less. During switching, capacitor 60 provides an A.C. short between base electrodes 16 and 26, and the fifty millivolt change applied at the base electrode 26 is insufficient to turn on second transistor 20. The value of capacitor 60 is determined by the maximum input rise and fall times, the input network configuration, and the maximum stored charge of first transistor 10 and second transistor 20. In any event, capacitor 60 is made large enough so that the voltage change at base electrode 26, occasioned by any discharging of capacitor 60, is insufficient to turn on second transistor 20 during the storage time of first transistor 10.

Second transistor 20 turns on after first transistor 10 is brought out of saturation. The output voltage is then approximately $+V_1$ volts and second transistor 20 can supply conventional current to the load. Moreover, the output capacitance 34 can charge rapidly, in the polarity direction indicated, through the low impedance collector 22-emitter 24 path. Thus, the output voltage can change abruptly after second transistor 20 turns on.

When the input voltage next changes from $-V_4$ to $+V_1$ volts, reverse base current is supplied to the base 26 of second transistor 20. The voltage at base 26 changes little during the storage time, and capacitor 60 operates in the manner previously discussed to hold the voltage at base 16 beyond cut-off value during the storage time of second transistor 20.

In essence, capacitor 60 allows the "on" transistor, which is the slower to change states, to control the change of voltage at both bases 16 and 26 until the "on" transistor is brought out of saturation, thus preventing both transistors 10 and 20 from being on at the same time. Capacitor 60 also makes the charge on both speed-up capacitors 42 and 48 available to turn "off" the "on" transistor. In general it may be said that little or no compromise in circuit speed is occasioned by capacitor 60; in fact, this capacitor 60 tends to optimize speed capabilities safely.

Although the circuit has been described and illustrated as employing the parallel combination of a resistor and a capacitor for coupling and level shifting, it is to be understood that other types of input networks also can be used. For example, a resistor or a level shift diode may replace the resistor-capacitor combination. In one operative embodiment of the circuit using a resistor alone as the coupling and level shift element, the components were as follows:

| | |
|---|---|
| Resistors **40, 46** | —12K ohms. |
| Resistor **56** | 30K ohms. |
| Resistor **58** | 22K ohms. |
| Capacitor **60** | 620 $\mu\mu$f. |
| Transistor **10** | 2N585. |
| Transistor **20** | 2N404. |
| $V_1$ | 6.5 volts. |
| $-V_2$ | —19.5 volts. |
| $V_3$ | 13 volts. |
| $-V_4$ | —13 volts. |

What is claimed is:

1. The combination comprising first and second transistors of opposite conductivity type having their collector-emitter paths connected in series between points of different operating potential;
   an output connection between said transistors;
   an input terminal;
   first coupling means connected between said input terminal and the base electrode of the first transistor;
   second, separate coupling means connected between said input terminal and the base electrode of the second transistor;
   means for normally applying a first voltage at said input treminal having a value to bias said first transistor into saturation and to bias said second transistor in a nonconducting condition;
   means for selectively changing the voltage at said input terminal to a value to bias said second transistor into saturation and to bias said first transistor in a nonconducting condition; and
   a capacitor directly connected between the base electrodes of said first and second transistors and having a value to prevent the nonconducting transistor from turning on during the saturation delay time of the saturated transistor when the input voltage is changed.

2. The combination comprising first and second transistors of opposite conductivity type having their collector-emitter paths connected in series between points of different operating potential;
   an output connection between said transistors;
   an input terminal;

first D.C. coupling means connected between said input terminal and the base electrode of the first transistor;

second D.C. coupling means connected between said input terminal and the base of the second transistor;

first bias means connected to the base electrode of said first transistor and tending to bias said first transistor in the nonconducting condition;

second bias means connected to the base electrode of said second transistor and tending to bias said second transistor in the nonconducting condition;

means for applying at said input terminal a voltage of a first value or a second value, selectively, said first value being sufficient to overcome the bias of said first bias means and to bias said first transistor into saturation, said second value being sufficient to overcome the bias of said second bias means and to bias said second transistor into saturation; and a capacitor directly connected between the base electrodes of said first and second transistors and having a value to prevent the nonconducting transistor from turning on, in response to a change in input voltage, while the other transistor is in saturation.

3. The combination comprising first and second transistors of opposite conductivity type each having base, emitter and collector electrodes;

an output connection;

means connecting said output connection to both collector electrodes;

means connecting said emitter electrodes to points of different operating potential;

an input terminal;

first and second separate coupling means connected between said input terminal and the base electrodes of said first and second transistors, respectively;

means for selectively switching the voltage at said input terminal between a first value and a second value, said first value being effective to bias said first transistor into saturation and to cut off said second transistor, said second value of voltage being effective to bias said second transistor into saturation and to cut off said first transistor; and a capacitor having one terminal connected to the junction between the base electrode of said first transistor and said first coupling means and having a second terminal connected to the junction between the base electrode of said second transistor and said second coupling means, said capacitor having a value of capacitance sufficient to prevent either transistor from turning on in response to a change in input voltage while the other transistor is in saturation.

4. The combination comprising first and second transistors of opposite conductivity type each having base emitter and collector electrodes;

an output connection;

means connecting said output connection to both collector electrodes;

means connecting each of said emitter electrodes to a point of different operating potential;

an input terminal;

first and second separate coupling means connected between said input terminal and the base electrodes of said first and second transistors, respectively;

means for selectively switching the voltage at said input terminal between a first value and a second value, said first value being effective to bias said first transistor into saturation and to cut off said second transistor, said second value of voltage being effective to bias said second transistor into saturation and to cut off said first transistor, whereby one of the transistors is in saturation and the other transistor is nonconducting in the steady state; and a capacitor directly connected between the base electrodes of said first and second transistors and being operative in response to a change of voltage at said input terminal to hold the voltage at the base electrode of the nonconducting transistor beyond cutoff value until the saturated transistor is brought out of saturation.

No references cited.